June 9, 1953  E. F. RAUSCHER  2,641,426
MOTOR AND TRANSMISSION COMPARTMENT FOR WASHING MACHINES
Filed March 17, 1949  2 Sheets-Sheet 1
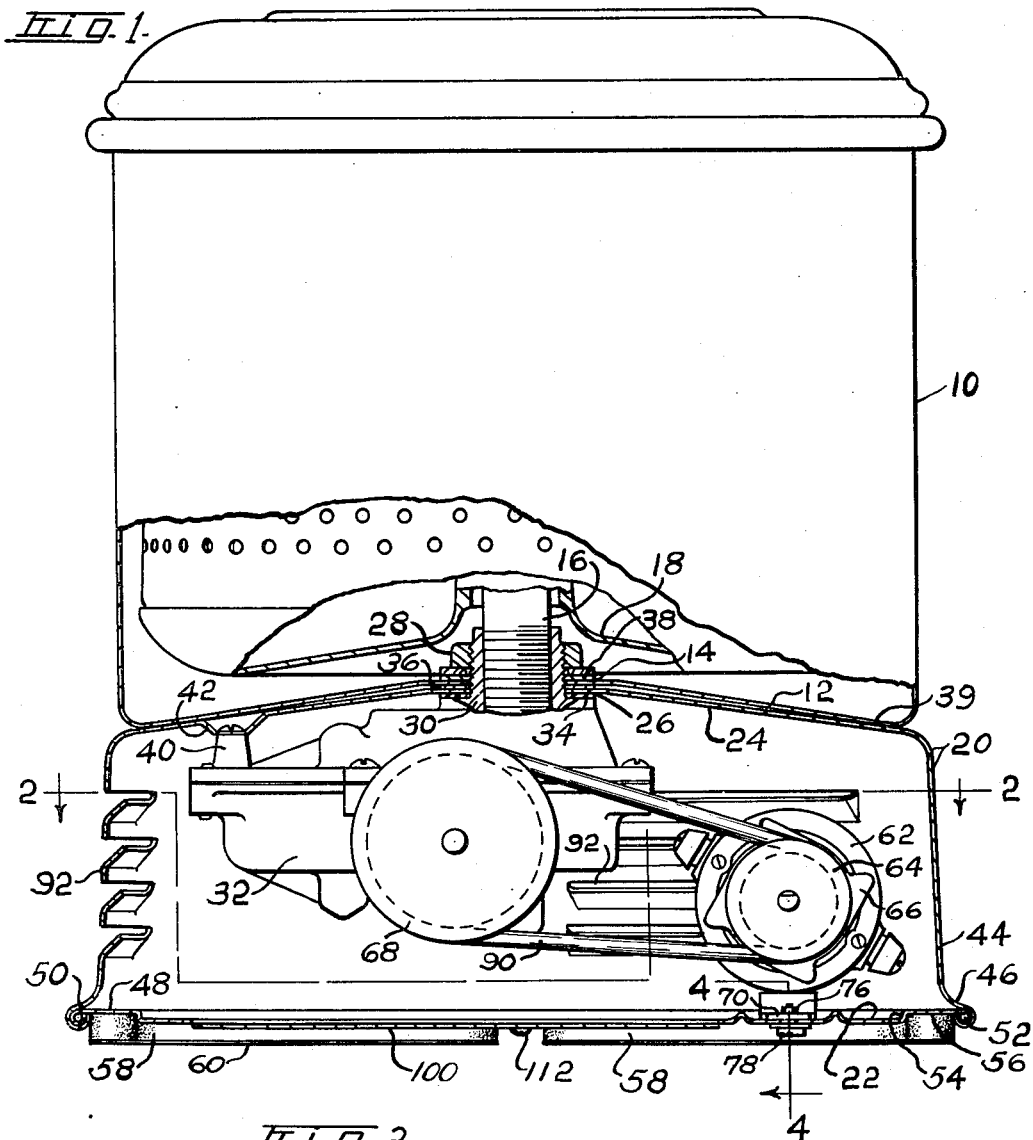
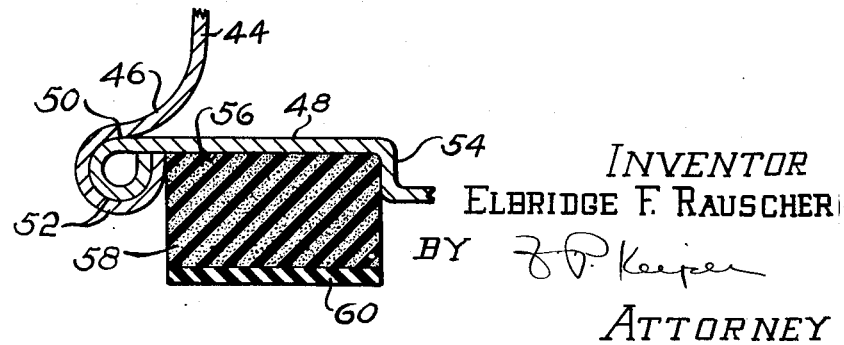
INVENTOR
ELBRIDGE F. RAUSCHER
BY
ATTORNEY June 9, 1953 E. F. RAUSCHER 2,641,426
MOTOR AND TRANSMISSION COMPARTMENT FOR WASHING MACHINES
Filed March 17, 1949 2 Sheets-Sheet 2
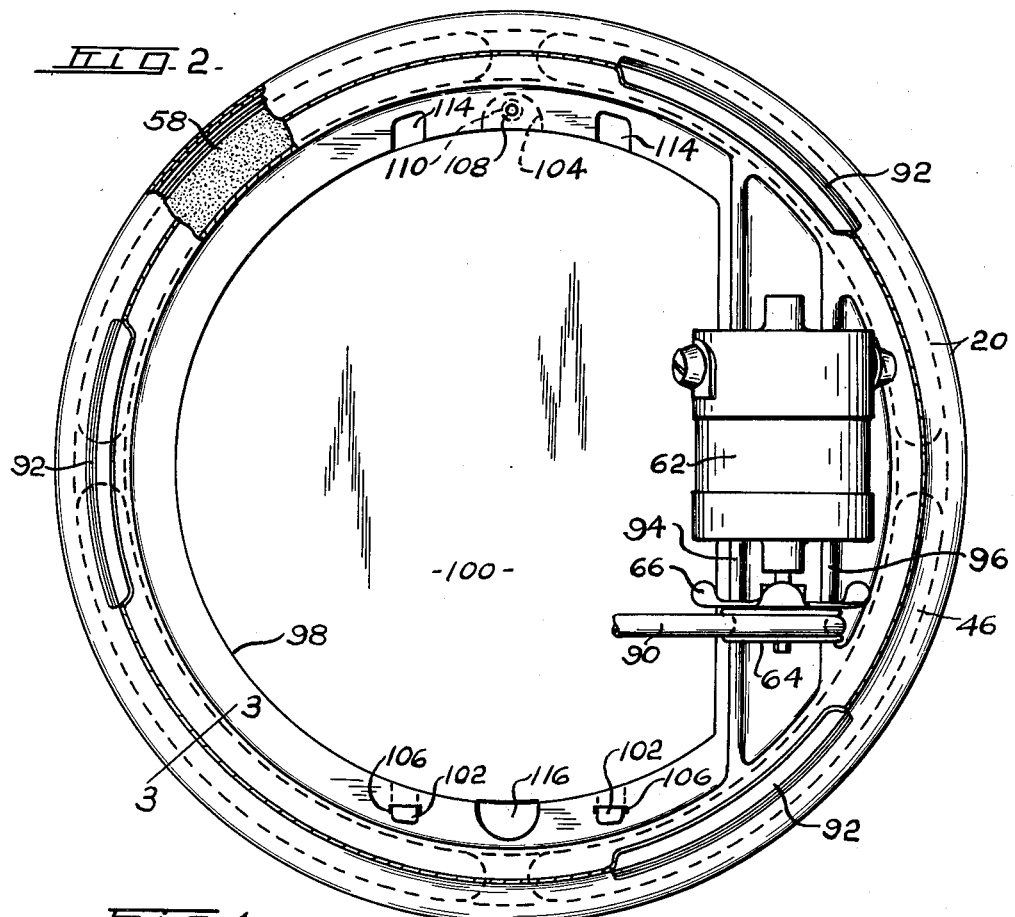
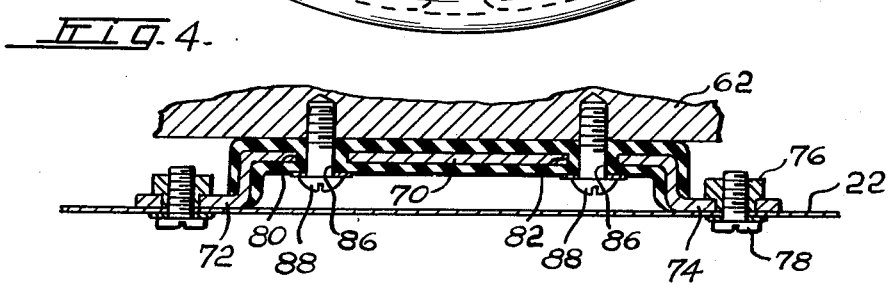
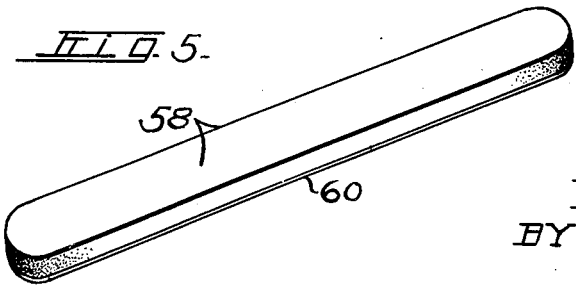
INVENTOR
ELBRIDGE F. RAUSCHER
BY
ATTORNEY Patented June 9, 1953

2,641,426

UNITED STATES PATENT OFFICE 2,641,426

MOTOR AND TRANSMISSION COMPARTMENT FOR WASHING MACHINES

Elbridge F. Rauscher, Syracuse, N. Y., assignor to Easy Washing Machine Corporation, Syracuse, N. Y., a corporation of Delaware Application March 17, 1949, Serial No. 81,963

6 Claims. (Cl. 248—22)

This invention relates to washing machines of the single tub type, and more particularly to a base and motor housing structure therefor.

In washing machines of the single tub type, there is generally provided a base having side skirts providing a mounting and housing for the drive mechanism and motor. Such machines generally include provision for centrifugal extraction for damp drying, resulting in vibration, requiring a rigid base, and satisfactory footing therefor.

It is accordingly an object of the present invention to provide a base structure which shall have sufficient rigidity and strength for adequately supporting the mechanism and wash tub, and which shall provide resilient footing for the machine such that transmission of vibration to a supporting structure may be minimized. Additionally, provision is made for adequately enclosing the electrical parts, particularly the motor, within such housing and insulating such motor so as to prevent danger of shock. A further feature of the invention is the provision of ventilation for the drive motor so arranged as to strengthen the base, adequately cool the parts, and yet prevent wash water from entering the base compartment. Further objects relate to the provision of a structure having ease of fabrication and economy of manufacture.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a side elevation of a washing machine with the base thereof shown in section;

Figure 2 is a transverse sectional view taken substantially on the line 2—2 of Figure 1;

Figure 3 is a section taken substantially on the line 3—3 of Figure 2;

Figure 4 is a section through the motor mount taken substantially on the line 4—4 of Figure 1; and Figure 5 is a perspective view of the resilient plastic mounting foot applied beneath the base.

Referring to Figure 1, there is shown a tub 10 having a bottom wall 12 and central aperture 14 through which extends an upstanding sleeve 16 about which is mounted a perforated clothes containing basket 18. The basket is adapted to be oscillated for washing of laundry contained therein, and subsequently rotated at centrifugal extracting speed for the removal of moisture from the laundry. The operation is similar to that shown, for example, in the Patent No. 1,957,978 to Reama.

The tub is supported upon a base composed of a skirted platform member 20 and a lower base plate 22. The platform portion 24 has a central aperture 26 to receive the upstanding sleeve 16, and both tub and platform are secured rigidly together as by clamping between the threaded members 28 and 30, the latter being a tubular extension of the gear casing 32. Suitable spacing washers 34, 36, and 38 are arranged below, between, and above the platform 24 and tub bottom 12 and clamped between the members 28 and 30. Additionally, the tub bottom and platform may be suitably dished so that the one bears solidly and resiliently upon the other along an annular bearing area such as 39. The gear casing has a torque or bracing connection with the platform 24 through a gear casing carried boss 40 rigidly secured to a depressed dimple 42 in the platform 24 by screw fastening means or the like. The sleeve 16 may be threaded within the threaded member 30 and houses concentric drive shafts extending between the transmission and basket for transmitting oscillatory or rotary motion to the basket in a manner similar to that disclosed in the aforementioned patent.

The lower circular edge of the skirt portion 44 is outwardly flared as at 46 to engage the top marginal surface of a circular base plate 48 as at 50. The skirt edge and base plate edge are rolled together inwardly and underneath as at 52, to rigidly connect the base and skirt circumferentially thereof. The base plate is provided with an annular offset 54, the central portion of the plate being somewhat depressed thereby. Such offset also provides, in conjunction with the rolled edge 52, an inverted annular channel 56 suitably adapted for the reception of arcuate resilient mounting feet 58. Such mounting feet are composed of spongy rubber-like material with a vulcanized rubber layer 60 on its lower surface providing suitable padding for engagement with a supporting surface such as a corrugated sink drainboard or supporting shelf, or the like. Each arcuate foot may have a length approaching 90° and may in practice be formed of a straight bar of spongy rubber with the vulcanized rubber layer as described, as shown in Figure 5, and the latter, by reason of its resiliency, curved to fit within the channel 56 where it may be secured to the channel by suitable cementitious substance or other means.

The bottom plate, with its rigid connection to the skirt, forms a rugged and relatively rigid base construction for the tub and at the same time, a closed compartment for a motor drive and gear mechanism as illustrated. The base plate may, if desired, due to its rigidity, support a drive motor 62 having a drive pulley 64 and circulating fan 66, the drive pulley being aligned with a driven pulley 68 on the transmission 32. The motor may be mounted upon a bracket 70 having reverse bent or stepped ends 72 and 74 adapted to be secured to the base plate 22. Each of the ends 72 and 74 have affixed thereto by riveting or otherwise, shouldered and threaded bushings 76 into which are threaded securing screws 78 extending up through apertures in the bottom plate 22. The central portion of the bracket 70 is shrouded with vulcanized rubber of a relatively high durometer hardness, and is provided with a pair of spaced apertures 80 and 82 through which such rubber extends from opposite ends. The rubber extending through such apertures is in turn provided with central apertures 86 adapted to receive screws 88 extending into the frame of the motor 62 and rigidly securing the motor to the bracket and hence to the base plate 22.

It will be observed that the rubber or rubber-like shroud provides adequate insulating sleeves about the securing screws 88, as well as insulation for the motor 62, so that the motor may be completely insulated from the base structure of the washing machine. By reason of the circular section rubber or rubber-like composition belt 90 interconnecting the driving and driven pulleys 64 and 68, the motor is completely isolated in every respect from the base structure so that danger from shock is completely eliminated, which danger of course may be present in washing machines because of the occasional splash which is likely to wet such insulation as is ordinarily provided.

It will be seen that the shroud about the bracket 70 extends for a considerable distance beyond the point of contact of the motor thereupon, so that enhanced insulating value is provided even though the surface of such rubber should accidentally become wet.

While the motor is thus protected, yet a circulation of air is provided for within the casing by reason of the louvres 92 arranged in multiple at spaced points about the skirt 44. The form shown utilizes louvres spaced at three points about the skirt. The inclination of the louvres is so directed as to shed any water splash from the tub 10 outwardly of the motor compartment formed by the skirted platform 20 and base member 22, and the louvre flanges are such as to stiffen the skirt.

The base member 22 is rigidified adjacent the motor mount by chordal extending ribs 94 and 96 arranged on either side of the bracket 70, the chordal ribs being of a height preferably to blend nicely at their ends in the offset 54. In order to provide access to the compartment, the base member 22 is provided with a D-shaped aperture 98 over which is affixed a cover plate 100 of complemental D configuration. The cover plate is so designed as to be capable of being struck from the base plate in a press operation, and for the purpose of securing such cover plate to the base member, integral fingers 102 are struck simultaneously from the base member 22 on one side and a tab 104 located substantially diametrically opposite the fingers 102 is similarly struck from the base member. The base member is provided with slots 106 and diametrically opposite thereto adjacent the rim of the base member, there is provided a threaded aperture 108. A screw extending through an aperture 110 in the tab 104 is threaded into the aperture 108 so that the cover plate 100 may be secured to the base member by first inserting the fingers 102 in the slots 106 and thereafter securing the tab by the screw 112.

The apertures 114 in the inside rim of the base member from which the fingers 102 are struck and the aperture 116 from which the tab 104 is struck provide additional ventilating means for the compartment as well as drainage for any water which may possibly gain access to the compartment.

It will be seen that the structure thus provided is sufficiently rigid to be capable of supporting the motor 62 and withstand the tension of the belt drive 90 to the gear mechanism 32. At the same time, the tension of the belt upon the gear mechanism is adequately resisted by the connection of the gear mechanism through the boss 40 to the dimple 42 in the platform portion 24 of the part 20.

In the form shown, a relatively high speed series motor is used for driving the gear case, but it will be understood that by reversing the pulleys, a lower speed induction motor might be employed with the same transmission, and while the base structure is sufficiently rigid to support the motor from the bottom and the gear case from the top, the motor may, if desired, be secured from the platform portion 24 by suitable depending bracket means rigidly secured thereto.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a single tub washing machine, a motor and transmission compartment, comprising spaced substantially horizontal plates, the lower plate being circular, the upper plate being adapted to support a tub, having a circular depending skirt extending to the circular edge of the lower plate, and being outwardly flared, and having its marginal edge together with the marginal edge of the lower plate rolled together beneath the lower plate to form a rolled flange around the edge of the lower plate, said lower plate having an annular downwardly directed offset radially inwardly spaced from said rolled flange to provide together with said rolled edge an annular inverted circular channel, and arcuate resilient plastic blocks secured in said channel forming feet for said compartment.

2. In a single tube washing machine, a motor and transmission compartment, comprising spaced substantially horizontal plates, the lower plate being circular, the upper plate being adapted to support a tub, having a circular depending skirt extending to the circular edge of the lower plate, and being outwardly flared, and having its marginal edge together with the marginal edge of the lower plate rolled together beneath the lower plate to form a rolled flange around the edge of the lower plate, said lower plate having an annular downwardly directed offset radially inwardly spaced from said rolled flange to provide together with said rolled flange an annular inverted circular channel, spaced chordal stiffening ribs extending between and blending into said offset, and arcuate resilient plastic block feet secured in said channel.

3. In a single tub washing machine, a motor and transmission compartment, comprising spaced substantially horizontal plates, the lower plate being circular, the upper plate being adapted to support a tub, having a circular depending skirt extending to the circular edge of the lower plate, and being outwardly flared, and having its marginal edge together with the marginal edge of the lower plate rolled together beneath the lower plate to form a rolled flange around the edge of the lower plate, said lower plate having an annular downwardly directed offset radially inwardly spaced from said rolled flange to provide an annular inverted circular channel, and having spaced chordal stiffening ribs extending between and blending into said offset, a motor mount between said ribs comprising a bracket having offset attachment portions secured to said bottom plate at either end, and bonded rubber insulation over the other portions and a motor insulatingly mounted thereon.

4. In a single tub washing machine, a tub, a base comprising an elevated tub supporting circular member having a depending skirt, a circular bottom plate, the lower edge of said skirt and the edge of said bottom plate being rolled together to form a marginal rolled joint extending below the bottom plate, an annular downwardly directed offset in said bottom plate inwardly spaced from the edge thereof forming with said rolled joint an annular downwardly directed channel, and a plurality of elongated arcuate resilient cushion members seated in said channel.

5. In a single tub washing machine, a circular tub support plate having a depending skirt, a transverse circular bottom plate, said skirt being flared outwardly along its lower edge, and having rolled edge engagement with the bottom plate, an annular downwardly directed offset inwardly spaced from said rolled edge engagement to provide an annular recess of inverted U-shape vertical radial cross-section, and elongated resilient blocks of substantially rectangular cross section secured in said recess and projecting below said skirt and offset.

6. In a single tub washing machine, a motor and transmission compartment, comprising spaced substantially horizontal plates, the lower plate being circular, the upper plate being adapted to support a tub, having a circular depending skirt extending to the circular edge of the lower plate, and being outwardly flared, and having its marginal edge together with the marginal edge of the plate rolled together beneath the lower plate to form a rolled flange around the edge of the lower plate, and said lower plate having an annular downwardly directed offset radially inwardly spaced from said rolled flange to provide an annular inverted circular channel with spaced chordal stiffening ribs extending between and blending into said offset, said lower plate having a substantially D-shaped opening struck therein with opposed notches, and a correspondingly shaped bottom plate struck therefrom with the fingers formed from said notches, said bottom plate being reversely oriented with respect to the D-shaped opening, and fastening means including said fingers for securing said bottom plate to said lower plate.

ELBRIDGE F. RAUSCHER.

References Cited in the file of this patent

UNITED STATES PATENTS

| Number | Name | Date |
|---|---|---|
| 475,231 | Anderson | May 17, 1892 |
| 526,460 | Roennau | Sept. 25, 1894 |
| 782,736 | Epperson | Feb. 14, 1905 |
| 1,298,968 | Lambert | Apr. 1, 1919 |
| 1,398,261 | Geisler | Nov. 29, 1921 |
| 1,489,950 | Kronquest | Apr. 8, 1924 |
| 1,557,826 | Geiger | Oct. 20, 1925 |
| 1,913,378 | Dunham | June 13, 1933 |
| 2,018,271 | Lewis | Oct. 22, 1935 |
| 2,064,526 | Engel | Dec. 15, 1936 |
| 2,119,918 | Kirby | June 7, 1938 |
| 2,132,840 | Workman et al. | Oct. 11, 1938 |
| 2,136,787 | Dunham | Nov. 15, 1938 |
| 2,141,648 | Geyer | Dec. 27, 1938 |
| 2,157,255 | Bumpass | May 9, 1939 |
| 2,227,990 | Zelt | Jan. 7, 1941 |
| 2,300,231 | Landgraf | Oct. 27, 1942 |

FOREIGN PATENTS

| Number | Country | Date |
|---|---|---|
| 14,506 | Norway | Mar. 20, 1905 |
| 157,131 | Switzerland | Nov. 16, 1932 |